July 14, 1959  G. F. HITT  2,894,772
SELF SEATING KEY
Filed Sept. 27, 1956  2 Sheets-Sheet 1
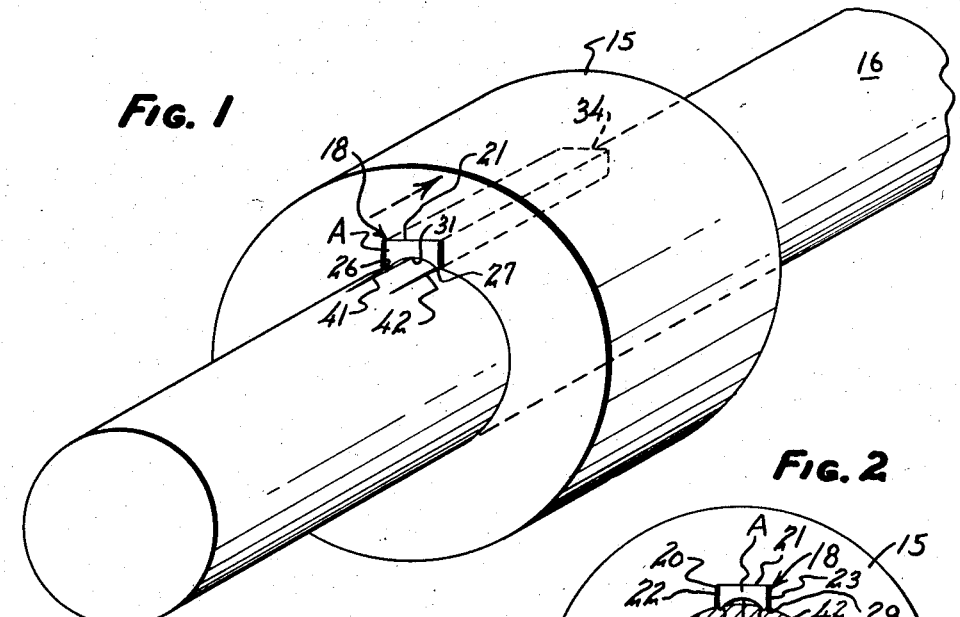
Fig. 1
Fig. 2
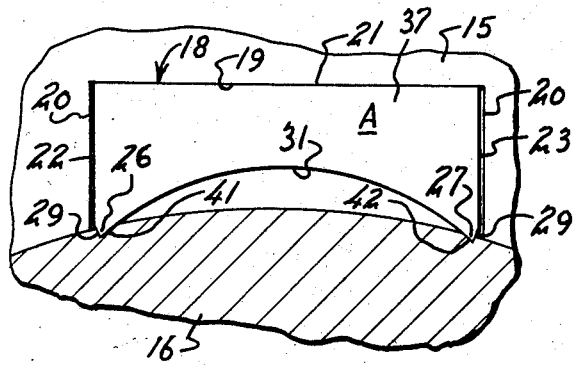
Fig. 3
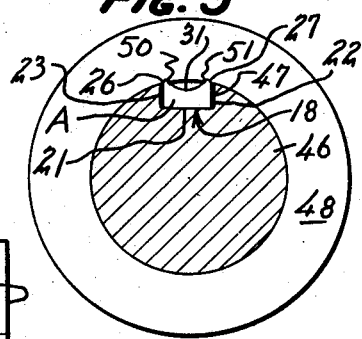
Fig. 5
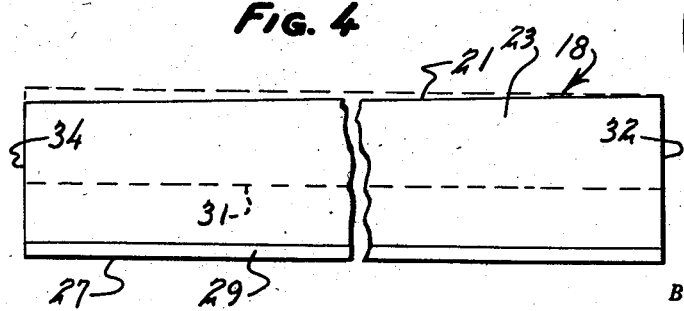
Fig. 4
INVENTOR.
GEORGE F. HITT
BY
Townsend and Townsend
ATTORNEYS July 14, 1959  G. F. HITT  2,894,772
SELF SEATING KEY
Filed Sept. 27, 1956  2 Sheets-Sheet 2

INVENTOR.
GEORGE F. HITT
BY
Townsend and Townsend
ATTORNEYS

United States Patent Office 2,894,772
Patented July 14, 1959

2,894,772
SELF SEATING KEY
George F. Hitt, Arcata, Calif.
Application September 27, 1956, Serial No. 612,408
2 Claims. (Cl. 287—52.05)

This invention relates to a key of the type used to prevent relative rotation between a shaft and a hub.

More specifically the invention relates to a self seating key which needs but a single keyway in either the shaft or the hub to enable the key to nonrotatably lock the latter two members.

In the assembly of many machine parts both a hub and a shaft are provided with complementary keyways into which a key may be inserted to lock the hub against rotation on the shaft. In such instances the key is of sufficient size to always occupy some of the area in the keyway provided in both the shaft and the hub so that it locks the two together and prevents relative rotation therebetween. It has been found that to mill a hub or shaft with a keyway is costly and in addition weakens the structure of the member.

A principal object of this invention is to provide a novel key which requires but a single keyway in either the shaft or the hub in order to nonrotatably lock the two members together.

Another object of this invention is the provision of a key of the unique structural configuration shaped as to cut or tap a keyway in a shaft or hub.

A more specific object of this invention is to provide a key shaped in cross-section with three sides arranged to snugly fit within a keyway of a selected or predetermined size and with a fourth side defining a concave face terminating at each edge with two wedge shaped edges arranged to project beyond the journal or bearing face of the keyway member so that when the key is forced into the keyway the edges cut grooves which function as second keyways.

A feature and advantage of the novel key is that, for example, where the hub is provided with a preformed keyway, the novel key member may be forced into the keyway while the hub is mounted on a shaft at any selected position and there locked against relative rotation.

Another object of this invention is that in one embodiment of the invention there is provided a continuous spring tension to urge the wedge shaped edges of the key tightly against the hub or shaft surface.

Other objects of the present invention will become apparent upon reading the following specification and referring to the accompanying drawings in which similar characters of reference represent corresponding parts in each of the several views.

In the drawings:

Fig. 1 is a perspective view showing a shaft and a hub mounted to the shaft by the novel key of the invention.

Fig. 2 is a cross-section of Fig. 1.

Fig. 3 is an enlarged detailed fragmentary view of Fig. 2.

Fig. 4 is an enlarged elevation of the novel key.

Fig. 5 is a cross-section of a hub mounted on a shaft in which only the shaft is provided with a pre-cut keyway.

Figure 6:
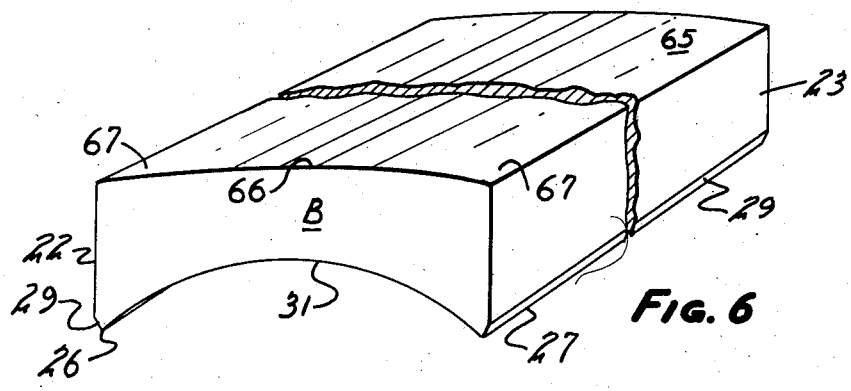
Fig. 6 is a perspective fragmentary view of a modification of the novel key.

Referring now to the drawings and with particular reference to Figs. 1, 2, 3 and 4 there is shown one embodiment of the invention. In this embodiment a hub 15 is mounted on a shaft 16. The hub 15 is formed with a keyway 18 having a base surface 19 and two side walls 20. The key A is shaped in cross-section, as viewed in Fig. 3, and includes a top 21 and two sides 22 and 23 which are arranged to snugly fit within keyway 18. The distance between the two sides 22 and 23 is approximately the width between walls 20 of the keyway. The top 21 of the key A is complementary with base surface 19 of the keyway. The bottom of the key A in cross-section has two wedge or knife shaped edges 26 and 27 which run the entire length of the key adjacent the two sides 22 and 23. The outer edge 29 of the wedge sections forms an extension of sides 22 and 23 and the inner edges are contoured inwardly to define a longitudinal concave bottom center 31 of the key. In elevation key A is rectangular in all dimensions except for top surface 21. The top 21 tapers or slopes downwardly from the rear end 32 towards the front end 34 so that the overall dimension of the key A in elevation increases from the front to the rear.

The cross-section of the key at front end 34 is shaped to fit within keyway 18 with a small amount of clearance between the top surface 21 and base surface 19, when the edges 26 and 27 are engaged with the journal surface of shaft 16.

In operation the hub 15 is placed on shaft 16, front end 34 of key A is inserted into keyway 18 and thence key A is hammered or otherwise forcefully urged into the keyway. The tapered top surface 21 engages with base surface 19 to force the edges 26 and 27 to cut grooves 41 and 42 in the axle as the key A is hammered into keyway 18. When key A is driven a slight distance into the keyway the top 21 of the front end engages with the base 19 of the keyway 18 so there is a sufficient projection of the cutting edges 26 and 27 below the bearing surface of the hub to force them into the shaft 16 and to cut the grooves 41 and 42. The taper of the top 21 is such that the farther the key is driven into the keyway the more cutting force will be exerted to force edges 26 and 27 to cut increasingly deeper grooves.

It is desirable that the key A be made of a sufficiently hard material, such as tool steel, to cut the grooves 41 and 42. In any event the key should be of harder material than the material into which it is to cut. It has been found that the key hereinbefore described is capable of exerting tremendous holding force in keeping an axle and hub aligned so that it is possible to mount the hub 15 on shaft 16 without the necessity of milling a keyway in the shaft. After the key A is installed it may be later removed in the same manner as conventional keys and then may be reinstalled so the wedge edges 26 and 27 are in the same grooves. The hub may also be rotated with the key removed and new grooves cut as hereinabove described.

Referring to Fig. 5 it is illustrated that a shaft 46 may be provided with a previously milled keyway 47 and a hub 48 having no keyway may be locked nonrotatably on the shaft in substantially the same manner by inverting key A so that the wedge shaped edges 26 and 27 project outwardly against the inner bearing surfaces of hub 48. In this instance the wedge edges 26 and 27 cut grooves 50 and 51 in the hub in the same fashion as the edges cut the grooves 41 and 42 in shaft 16.

Figure 8:
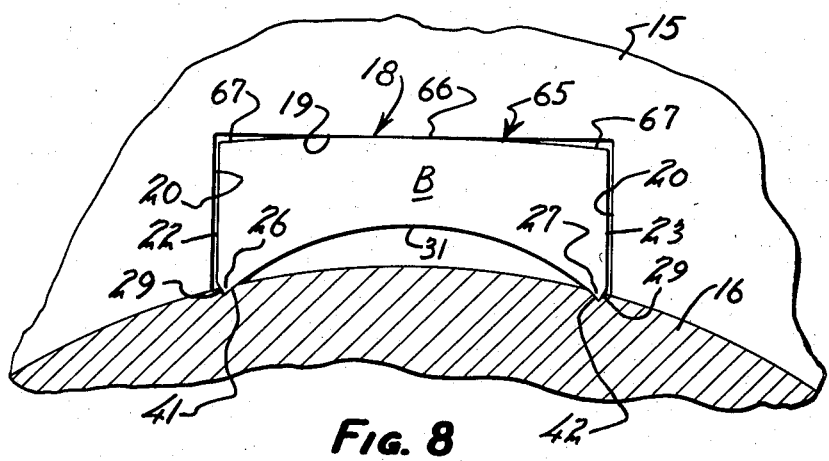
Fig. 8 is a sectional view of the modified key mounted in a pre-cut keyway of a hub and engaged with a shaft; the hub and the shaft being shown fragmentarily.
Figure 7:
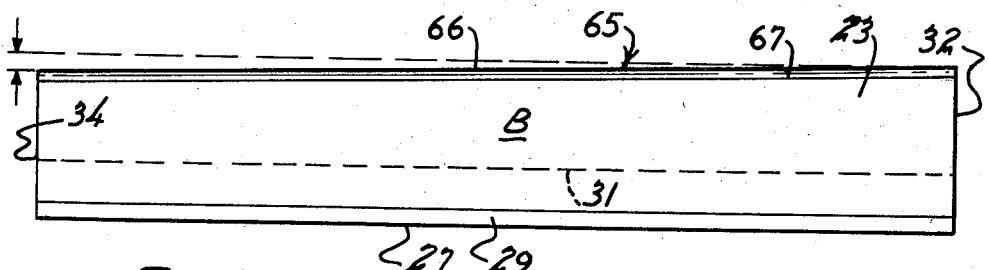
Fig. 7 is an elevation of the modified key of Fig. 6.

Referring now to Figs. 6, 7 and 8 there is shown a modification of the invention in which there is provided a key B having a basic dimension and shape identical to key A previously described. Accordingly identical reference numerals are designated except with respect to the top surface 21 of key B which is designated at 65. In this modification the top surface 65 is convex in cross-section, rising towards the center as at 66 and curving toward the sides to provide lesser heighth at the sides 67.

In operation the key B is inserted into the keyway 18 of hub 15 in exactly the same manner as hereinbefore described in connection with key A. However when key B is inserted in keyway 18 the raised top center axis of the key only bears against the keyway, and the key thus tends to flatten against the keyway in the nature of a spring. This causes a continual downward and outward pressure to spring bias the edges 26 and 27 into the grooves 41 and 42 and more securely lock the key B in position in said grooves.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A key to lock a hub member mounted on a shaft member against relative rotational movement where only a first one of said members is provided with a keyway in axial alignment with the longitudinal axis of the shaft member and having continuous unbroken side and base walls; said key comprising: an elongated tapered body having two longitudinal side faces spaced to fit between the side walls of the keyway; a top face arranged to abut the base wall of the keyway and a bottom face; said bottom face having two parallel cutting edges projecting outwardly therefrom with each cutting edge being parallel to and adjacent a respective one of the side faces; said top face of the body formed with a raised portion midway between the longitudinal side edges of the top face positioned and arranged to space the side edges of the top face in spaced relation with the base wall of the keyway.

2. A key to lock a hub member mounted on a shaft member against relative rotational movement where only a first one of said members is provided with a keyway in axial alignment with the longitudinal axis of the shaft member and having continuous unbroken side and base walls; said key comprising an elongated tapered body having two longitudinal side faces spaced to fit between the side walls of the keyway; a top face arranged to abut the base wall of the keyway and a bottom face; said bottom face having two parallel cutting edges projecting outwardly therefrom with each cutting edge being parallel to and adjacent a respective one of the side faces; said top face of the body formed with a raised portion midway between the longitudinal side edges of the top face positioned and arranged to space the side edges of the top face in spaced relation with the base wall of the keyway; said cutting edges formed to project beyond the keyway toward the other of the two members upon said key being forcefully inserted into said keyway whereby the raised portion of the top face of the body engages the base portion of the keyway to force said cutting edges to cut a fitting groove and bias the edges in the fitting groove to lock said key in said fitting groove.

References Cited in the file of this patent

UNITED STATES PATENTS

| 110,510 | Stedman | Dec. 27, 1870 |
| 296,317 | Dawe | Apr. 8, 1884 |
| 633,107 | Snyder | Sept. 12, 1899 |
| 1,448,277 | Lenz | Mar. 13, 1923 |